T. J. HALL.
Plow.
No. 3,782.
Reissued Dec. 28, 1869.
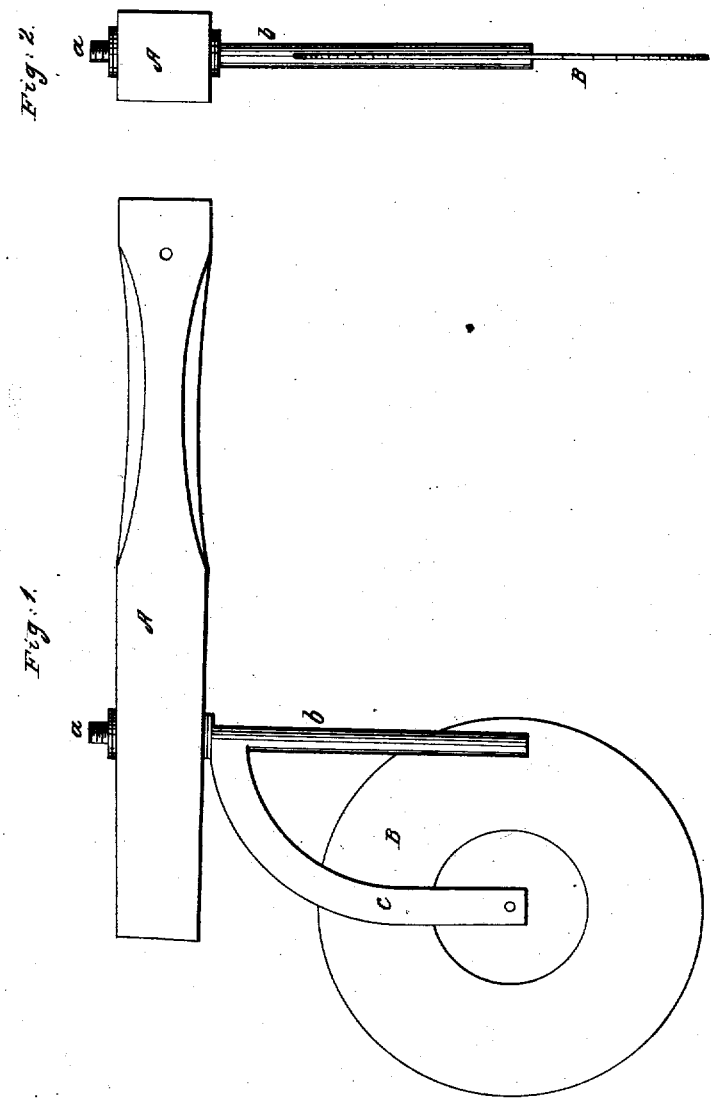
N. PETERS, Photo-Lithographer, Washington, D. C.

UNITED STATES PATENT OFFICE.

THOMAS J. HALL, OF BRYAN, TEXAS, FOR HIMSELF, AND HENRY P. STOCKTON AND ROBERT P. LANE, OF ROCKFORD, ILLINOIS, ASSIGNEES OF THOMAS J. HALL.

IMPROVEMENT IN PLOWS.

Specification forming part of Letters Patent No. 12,627, dated April 3, 1855; extended seven years; reissue No. 3,782, dated December 28, 1869.

*To whom it may concern:*

Be it known that THOMAS J. HALL, of Bryan, in the county of Brazos and State of Texas, did invent certain new and useful Improvements in Plows, and obtained Letters Patent therefor, which patent is dated April 3, 1855, and that we, THOMAS J. HALL, of Bryan, in the county of Brazos, in the State of Texas, and ROBERT P. LANE and HENRY P. STOCKTON, of Rockford, in the county of Winnebago, in the State of Illinois, are the sole owners of the entire patent; and we hereby declare that the following amended specification is a full and exact description of the invention, reference being had to the accompanying drawings, and to the letters of reference marked thereon.

Figure 1 is a side view, and Fig. 2 is an end view, both showing a section of the plow-beam and the mode of attaching the improvement thereto.

The invention consists in so attaching a revolving disk, cutter, or colter to the beam of the plow that it will rotate on its own axis, and vibrate laterally, to accommodate itself to the line of draft or direction of the beam of the plow; also, in the means used by which the revolving cutter or colter is attached to the beam of the plow, and having the means of swiveling or turning in the beam to accommodate itself to the line of draft of the plow.

To enable others skilled in the art to make and use this invention, we will describe the same.

A represents the beam of a plow. *b* is a forked shaft or rod passing through the beam A at the proper place in said beam, and so attached that it can freely swivel or turn in the beam, and still not be liable to drop out of its place while in use. *c c* are two curved braces or arms firmly attached to the rod *b*, near the under side of the beam A, and curve back and downward. B is a steel disk, of the proper diameter, hung on an axle between and passing through bearings in the end of the curved arms *c c*, so that it freely revolves on said axis, and between the curved arms and in the slot in the rod *b*, so hung that it shall project slightly through and forward of the rod *b*.

The entire periphery of this revolving disk or colter is brought to a sharp cutting-edge, so that it will easily penetrate into and make a clear cut in the sod or ground in advance of the breast of the plow, and in the direction the plow is caused to go. Heretofore cutters or colters for plows, whether revolving or otherwise, were rigidly attached to the beam of the plow, causing great strain upon the colter and the devices by which it was attached to the beam, whenever the plow was drawn from a straight line; but by this swiveling the revolving colter in the beam all that strain is prevented, and no more force is required to draw the plow when on a curved furrow than in cutting a straight one, and there would be no danger, in cutting such curved furrow, of throwing the plow out of the ground, as is the case where the colter cannot turn in the beam. This mode of giving the colter freedom to turn in the beam will cause the colter to cut its path directly in the line of direction given the beam, whichever way it may be turned, and at the same time acting on the plow upon the principle of a caster or rudder, making the plow more steady in the ground, and less irksome in the operation of holding.

This form and manner of attaching a disk-colter can be used on any plow, costs but little in its construction, and is durable, and not likely to get out of repair.

In the drawing only the beam of a plow is shown, to which what is described as the invention is attached; but it is obvious that such beam, with the invention, can be attached to and become a part of any plow.

Other constructions than what is herein described may be used for attaching the colter to the plow-beam, so that it may freely swivel or turn to follow the line of draft without departing from the spirit of the invention.

We do not claim a revolving cutter or colter wheel that simply revolves on its own axis, as such colters have been used, when attached to the beam of a plow; but such wheel-colters have never been, to our knowledge, so constructed as that they will swivel like a caster-wheel when attached to such beam by a shaft that is journaled in or to the beam of a plow, as the causing the revolving colter to so swivel is the gist of the invention; and we are not aware that prior to this invention there has been known or used a revolving colter or wheel-colter so constructed as to swivel in and accommodate itself to the line of draft or direction given the beam of such plow.

Having thus described the invention, its construction and operation, what we claim as new, and desire to secure by Letters Patent, is—

1. The cutter or colter wheel B, freely revolving on its own axis, when attached to the beam A of a plow, so that it will swivel or turn in such attachment, and the wheel-colter be free to vibrate laterally, and follow the line of draft or direction given to the beam of the plow, in the manner described.

2. The combination of the slotted rod *b*, curved arms *c c*, and wheel-colter B, with the swiveling of the rod *b* in the beam A, in the manner and for the purpose substantially as herein described.

THOS. J. HALL.
H. P. STOCKTON.

Witnesses:
EDM. F. BROWN,
JOHN F. FENNELL.

ROBERT P. LANE.

Witnesses:
GEORGE C. KING,
GEO. J. FISHER.